XR 3,365,568
CROSS REFERENCE SEARCH ROOM
350/96

Jan. 23, 1968 U. GERMEN 3,365,568

POSITION INDICATING APPARATUS

Filed Nov. 12, 1963 3 Sheets-Sheet 1

INVENTOR.
USTUN GERMEN
BY John V. Regan
Attorney

Jan. 23, 1968 U. GERMEN 3,365,568

POSITION INDICATING APPARATUS

Filed Nov. 12, 1963 3 Sheets-Sheet 2

INVENTOR.
USTUN GERMEN
BY John V. Regan
Attorney

POSITION INDICATING APPARATUS

Filed Nov. 12, 1963 3 Sheets-Sheet 3

INVENTOR.
USTUN GERMEN
BY John V. Regan
Attorney

United States Patent Office 3,365,568

Patented Jan. 23, 1968

3,365,568

POSITION INDICATING APPARATUS

Ustun Germen, Newton Center, Mass., assignor to Radio Corporation of America, a corporation of Delaware Filed Nov. 12, 1963, Ser. No. 322,757
8 Claims. (Cl. 235—61.11)

ABSTRACT OF THE DISCLOSURE

Described herein is a document position sensing arrangement which includes a first set of light paths at the input side of a work station and a second set of light paths at the output side. Each light path of the first set is optically coupled in series with a corresponding light path of the second set, and the light paths are located so as to be interrupted in sequence by a moving document. Only one complete series path is uninterrupted by a document at any one time, and detection of the uninterrupted path gives an indication of the position of the document.

In information handling systems, information may be recorded on documents in the form of meaningful patterns of perforations, recorded spots, etc. In one known type of record card, there are twelve rows and eighty columns of index point or data storage positions, and information is recorded by perforating the card at desired ones of the storage positions. Recorded information may be retrieved by passing the card through a reader having a line of sensing elements in number and position corresponding to the number and position of data storage positions within a card row or card column, depending upon whether the card is to be read row-by-row or column-by-column.

It is necessary to maintain timing synchronism between the operation of the perforators and the movement of the card in order that the information may be recorded at the proper data storage positions. During a read operation, the operation of the equipment receiving the sensed information should be synchronized with the position and movement of the card. Most prior art systems derive timing pulses from a pulse generator, such as a timing disk, which is mechanically coupled to the card feed means and driven in synchronism therewith. One disadvantage of a synchronizing scheme of this type is that the generation of timing pulses is not dependent directly on the position of the card itself. Any slippage of the card, backlash in the driving mechanism, difference in card feed time due to a difference in the number of cards in the input hopper, etc. may result in a loss of synchronism between the movement of the card and the operation of the pulse generator, with consequent loss of synchronism in the system and possible erroneous information transfer.

Another disadvantage of such a synchronizing scheme is that the card to be read or punched should be fed out of the input storage hopper at a precise point in the timing cycle. This requirement results in a loss of operating speed in a "command feed" system wherein cards are fed intermittently to the work station, recorder or reader for example, on command, rather than continuously. The command signal does not necessarily occur at the aforementioned precise point in the timing cycle, in which case the feeding of a card is delayed following a command pulse.

It is one object of this invention to provide an improved document position sensing and signalling arrangement that operates independently of document speed and is not affected adversely by slippage, backlash and other factors which cause the document to lose synchronism with the document feed means.

It is another object of this invention to provide improved apparatus for sensing the position of a document relative to a work station and for producing a signal identifying the line of data storage positions presented to the station.

It is still another object of this invention to provide a document position sensing and signalling system whose operation is directly dependent upon the position of the document.

It is a further object of this invention to provide a document position sensing and signalling system which allows a document to be fed to a work station at any point in a feed cycle.

It is yet another object of this invention to provide a system of the type described which does not require the use of a counter for counting timing pulses to produce an electrical indication of document position.

According to the invention, a first set of N light paths is located at the input side of a work station so as to be progressively interrupted by a document moving toward the station. These light paths are spaced from one another along the direction of document travel an amount equal to the distance between adjacent ones of the N lines of data storage positions on the document. A second set of N light paths is similarly positioned at the output side of the work station. Corresponding light paths of the first and second sets are optically coupled. Light is introduced at the input ends of the light paths in the first set and sensed at the output ends of the light paths in the second set.

In the accompanying drawing, like reference characters denote like components, and:

The document position sensing and signalling system of the invention is independent of the type of document employed and the method of recording information thereon. The documents may be magnetic cards having information recorded in the form of magnetized spots. The documents also may be punched cards, of the Hollerith type, for example. Other types of documents also may be used. Further, the invention may be used in readers, recorders and other equipment where it is desired to obtain an indication of document position. For purposes of explanation only, the invention will be described hereinafter as sensing and signalling the position of perforated record cards in a card reader apparatus.

Figure 1:
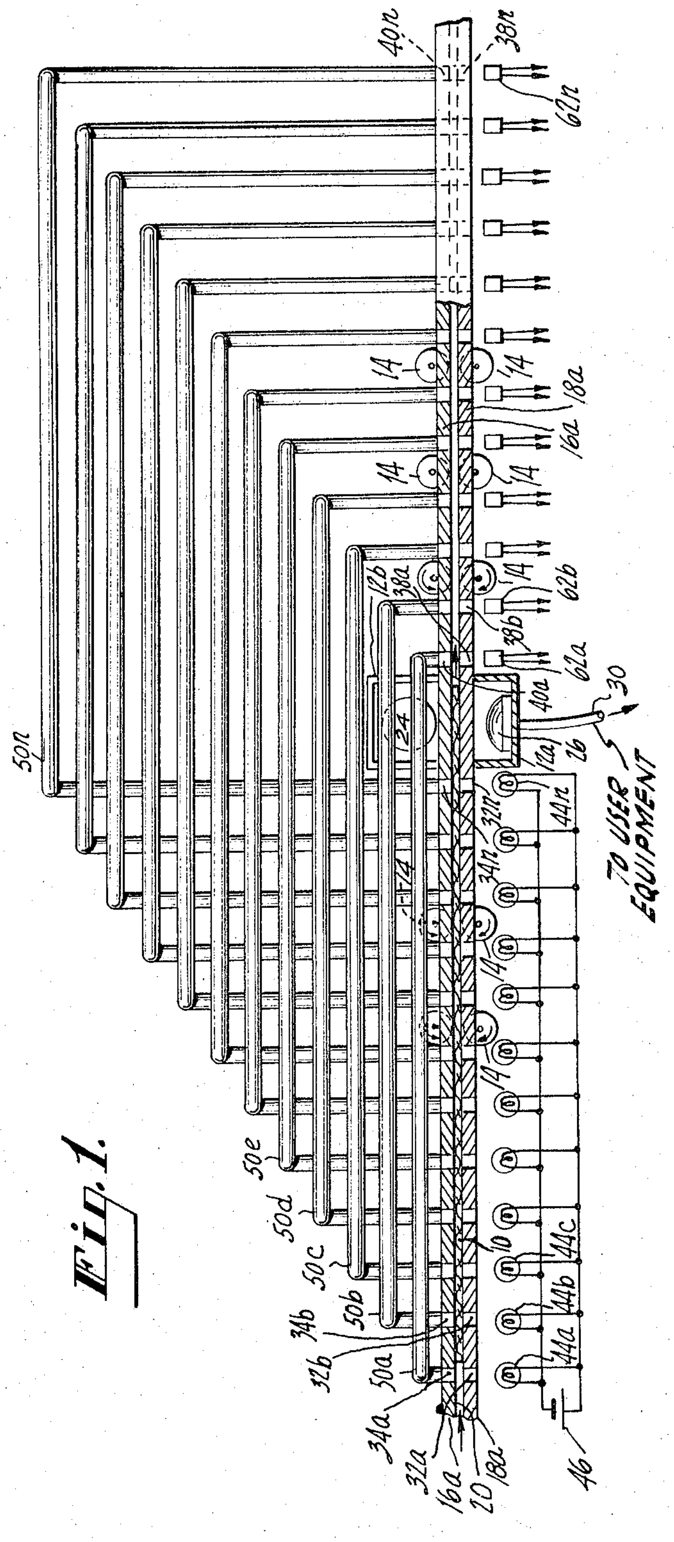
FIGURE 1 is a view of the invention in front elevation.

In FIGURE 1, record cards, such as the card 10, are transported in the left-to-right direction from an input card hopper (not shown) to a work station 12*a*, 12*b* by means of sets of feed rollers 14. One edge of the card 10 moves between upper and lower guide members 16*a* and 18*a* which are joined at their outer Kausoerse edges, as illustrated at the extreme right of FIGURE 1, and define a card guide channel 20. A second pair of guide members 16*b*, 18*b* (FIGURE 2) guides the opposite transverse edge of the card 10. The members 16*a*, 18*a* are shown partially in cross section in FIGURE 1 for purposes of illustrating certain details of the position sensing arrangement to be described. The work station is illustrated as a card reader comprising a light source 24 positioned above the card 10 in upper housing 12*b*. Rays of light from the source 24 pass through perforations in the line of the card 10 being read to a number of photo-responsive elements 26 in lower housing 12a, there being one element for each data storage position in the card line. For example, the card may have twelve rows and eighty columns of data storage positions. Assuming that the card is fed to the card reader in a direction perpendicular to the card rows, there would then be eighty photo-responsive elements 26, one for each card column. The outputs of the photo-responsive devices 26 are transmitted over leads in a multi-channel cable 30 to user equipment (not shown).

In order to detect the position of the card 10 relative to the work station and to provide a signal indicative of the card row presented to the reader, there is provided at the input side of the station a first set of N light paths defined by N pairs of mating apertures 32a . . . 32n and 34a . . . 34n in the lower and upper guide members 18a, 16a, respectively. A second set of N corresponding light paths is located on the output side of the work station. These latter light paths also may take the form of N pairs of mating apertures 38a . . . 38n and 40a . . . 40n in the lower and upper guide plates respectively. Illuminating means in the form of N separate light sources 44a . . . 44n are positioned beneath lower guide plate 18a, at the left side thereof, there being a different light source 44a . . . 44n associated with each of the apertures 32a . . . 32n. These light sources may be energized from a battery 46. Alternatively, a single light source may be used.

Each of the apertures 34a . . . 34n in the first set is optically coupled by means of a different "light pipe" 50a . . . 50n, respectively, to a corresponding one of the apertures 40a . . . 40n, respectively, in the second set. For example, one end of light pipe 50a is inserted into the aperture 34a, the other end is inserted into the aperture 40a; one end of the light pipe 50n is inserted into aperture 34n, the other end into aperture 40n, etc. One suitable type of "light pipe" is a bundle of light transmitting fibers known in the art as "fiber optics." Fiber optics and their characteristics are described in an article entitled "Fiber Optics for Electronics Engineers," appearing at page 37 of the June 1, 1962 issue of Electronics. Other types of light pipes, for example plastic refractive pipes or rods, also may be used as the optical coupling means, or a lens and mirror system could be employed. In FIGURE 1 a simplified form of the arrangement of the light pipes 50a . . . 50n is shown for the convenience of the readers in following the light paths. In an operating system, the light pipe 50a . . . 50n may take other physical paths depending on spacing etc., but the ends of the light pipes would be as illustrated.

Figure 2:
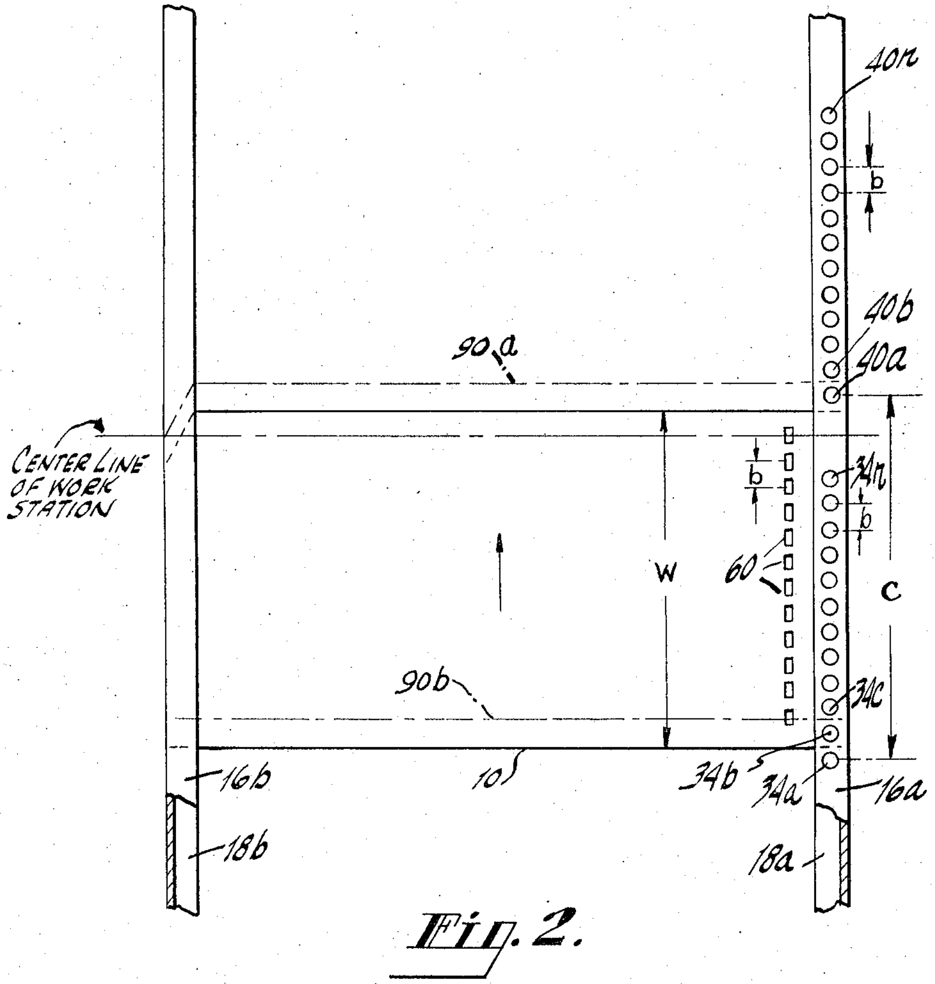
FIGURE 2 is a partial plan view of the card guide means of FIGURE 1, illustrating the position and spacing of the light path apertures relative to each other and to the center of the work station.

The spacing between the light paths of a set and the location of the sets of light paths relative to each other and to the work station may best be seen in FIGURE 2. FIGURE 2 is a partial plan view of the FIGURE 1 arrangement with work station, rollers and light pipes omitted for clarity of drawing. Document 10 has twelve rows of data storage positions. One column of the card is shown as having a perforation 60 in each of the data storage positions thereof. The distance between center lines of adjacent rows of storage positions is labeled $b$, and the dimension of the card 10 in the direction of card travel is labeled $w$. The spacing between adjacent ones of the apertures 34a . . . 34n in the first set of guide member 16a and between adjacent ones of the apertures 40a . . . 40n in the second set is $b$, corresponding to the spacing between adjacent rows of data storage positions on the card 10.

The first set of apertures 34a . . . 34n (and mating apertures 32a . . . 32b (FIGURE 1)) is located relative to the center-line of the reading elements in the work station 12a, 12b so that only the light path in the first set defined by the mating apertures 32a, 34a, furthermost from the work station, is unblocked when the first row of data storage positions on the card 10 is presented to the reader. Card 10 interrupts the light paths defined by all of the other pairs of apertures 32b . . . 32n and 34b . . . 34n of the first set when the card is in this position, shown in solid lines in FIGURE 2. None of the second set of light paths is interrupted at this time. accordingly, as may be seen in FIGURE 1, light from source 44a is introduced at the input of the furthermost aperture 32a and passes unobstructed through the path defined by apertures 32a, 34a and by way of light pipe 50a, to that aperture 40a of the second set which is nearest the work station. The light then passes downward along the path defined by apertures 40a and 38a to a photo-responsive device 62a. An output from this device 62a signifies that the first line of data storage positions on card 10 is in position to be read. None of the other photo-responsive devices 62b . . . 62n receives a light input at this time because all of the other light paths in the first set are interrupted by the card 10.

Consider now that the card 10 (FIGURE 2) is moved in the direction of the arrow a distance equal to one card row. The card then has the position shown by the dashed lines 90a, 90b, and the second row of data storage positions is in reading position at the work station. The first two light paths in the first set, defined by apertures 32a, 34a and 32b, 34b (FIGURE 1) now are unobstructed. However, the first light path of the second set, defined by mating apertures 40a, 38a is interrupted by the forward end of the card. Consequently, light passing from the light source 44a (FIGURE 1) through apertures 32a and 34a and conveyed by light pipe 50a to aperture 40a does not reach the photo-responsive element 62a because the card 10 is positioned between apertures 40a and 38a. Light from the second source 44b passes unobstructedly through apertures 32b, 34b, and light pipe 50b to the aperture 40b in the second set. The card is not interposed between the aperture 40b and 38b, whereby the light strikes the photo-responsive element 62b. An output from element 62b indicates that the second line of data storage positions is in position to be read.

The spacing between the furthermost aperture 34a of the first set and the nearest aperture 40a of the second set is labeled $c$ in FIGURE 2. This distance $c$ may be made equal to the dimension $w$ of the card 10 plus the distance $b$ between center lines of adjacent rows of data storage positions. In any event, the distance $c$ must be greater than $w$ and should not exceed $w+b$. When this condition is met, each of the photo-responsive elements 62a . . . 62n provides an output signal, in turn, as different ones of the card rows are presented to the work station. Only one of the photo-responsive elements 62a . . . 62n provides an output at any one time during a read operation.

Because the generation of the position indicating signals by the photo-responsive elements 62a . . . 62n depends only upon the position of the card 10 relative to the work station, there is never any error introduced by slippage of the card 10 in the feed rollers 14. Moreover, reading accuracy is unaffected by a change in speed of the rollers 14. Furthermore, a card 10 may be fed to the work station at any time, independent of the timing cycle of the feed rollers 14.

It has been suggested in the prior art that a single row of photo-responsive eelments be positioned on the output side of the work station along a line in the direction of card travel, whereby successive photo-responsive elements are covered by the card as the card moves through the work station. In the systems suggested, the outputs of the photo-responsive elements are supplied to a counting means, and the output of the counter is used as an indication of the card row being read. The counter is triggered each time the number of photo-responsive elements exposed to light is changed. In such a system an error is possible in the event that slippage of the card, after triggering of the counter, causes the card to move in a backward direction, since in that event the output of the counter will not correctly indicate the row of the card being read. This result is impossible in the present system.

An error in prior art systems may occur if the card being read should buckle. In the present system, if a card should buckle sufficiently to otherwise introduce an error, two corresponding light paths in the first and second sets will become unobstructed and two different photo-responsive elements will each produce an output. Circuitry (not shown) may be provided to detect this condition and disable the reader until the condition is corrected. The same circuitry may be used to disable the reader output, or control other circuitry, when no cards are being supplied to the reader.

Although the invention has been described hereinabove with particular reference to a card reader which reads card information a row at a time, the same principles apply to a system for reading cards a column at a time. In the latter event, of course, it may be necessary to change the number of light paths and light pipes, their spacing and location in dependence upon the number of card columns, their spacing and the card dimension in the direction of feed.

Many types of punched record cards have one corner cut off at an angle, for reasons which are not of importance here. The same corner is not missing on all cards, however. Card 10 of FIGURE 2, for example, has its upper left corner cut off. Another card may have one of the other corners cut off. It has been found that the missing corner has no effect on the operation of the system herein described when cards having eighty columns and twelve rows are fed in the direction illustrated in FIGURE 2, regardless of which corner of the card is missing. However, difficulty may be encountered when such cards are fed in a direction parallel to the card rows, for example in a column reader. The reason for this is that the card columns are generally spaced much closer than the rows, whereby the light paths are much closer together. The card may fail to interrupt ones of the light paths, as is required for proper operation, because of the missing card corner. This problem also can occur when the cards are fed in a direction parallel to the card columns if the rows are spaced very close together.

Figure 5:
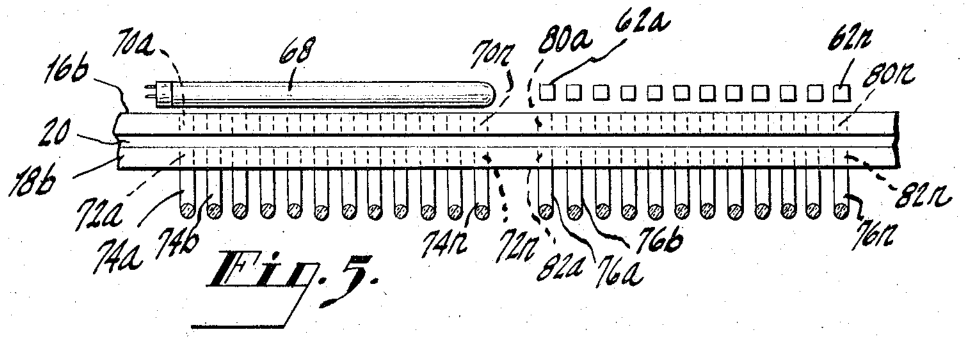
FIGURE 5 is a view taken along the lines 5—5 of FIGURE 3.
Figures 3, 4:
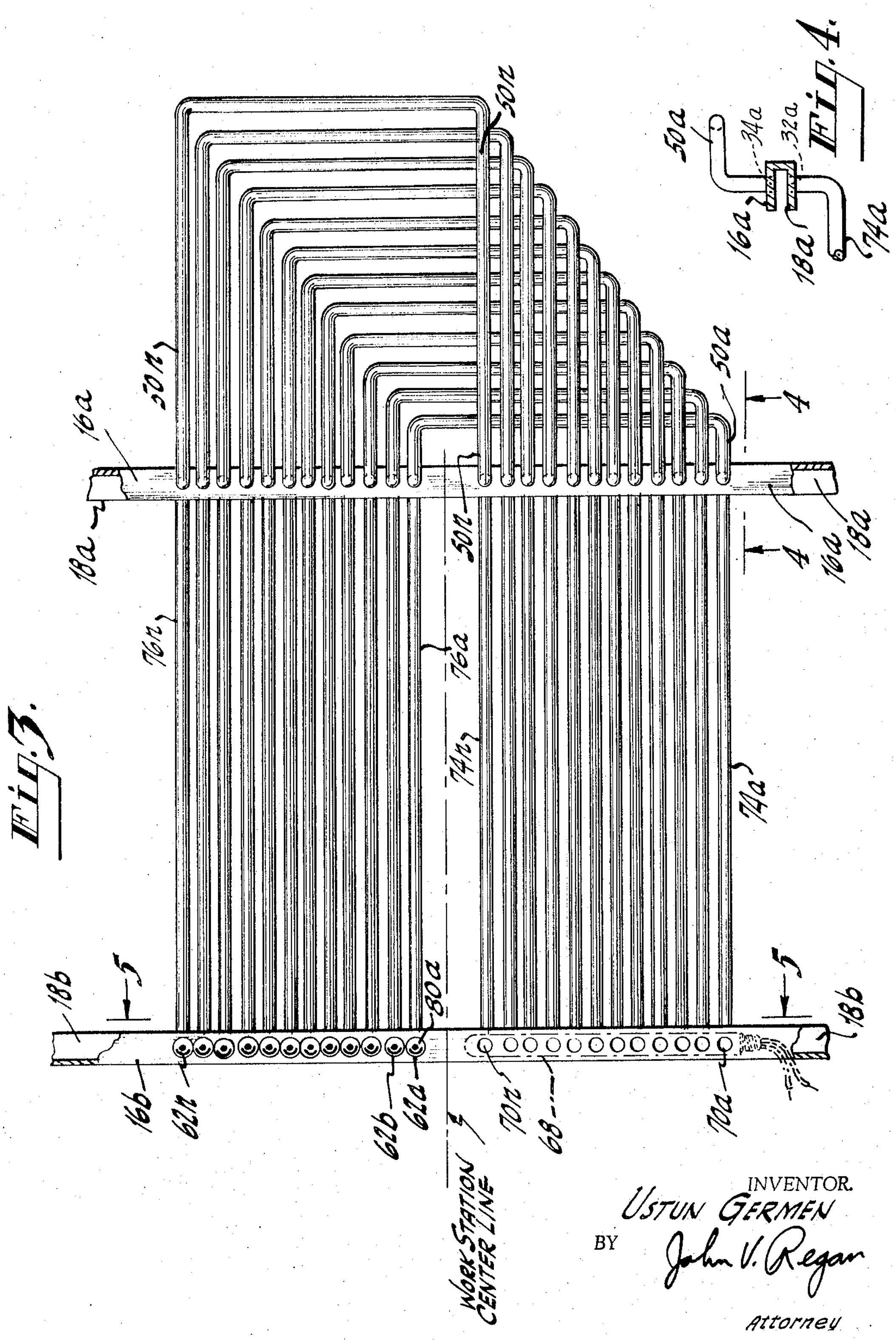
FIGURE 3 is a partial plan view of the card guide means, light pipes and apertures according to a modified form of the arrangement of FIGURE 1.
FIGURE 4 is a fragmentary end view taken along the lines 4—4 of FIGURE 3.

This problem and its undesirable result may be avoided by employing an arrangement of the type illustrated in FIGURES 3, 4 and 5. FIGURE 3 is a partial plan view of the card guide members 16*a*, 18*a* and 16*b*, 18*b*, and an arrangement of light paths and light pipes in which the various complete light paths essentially perform a multiple AND function. In particular, an output is obtained from a photo-responsive element 62*a* . . . 62*n* only when four serially coupled light paths associated therewith are all unobstructed by a record card. The reader station and record card are omitted in FIGURE 3 for clarity of drawing.

In FIGURE 3, the right hand guide members 18*a* and 16*a* have a first set of light paths defined by mating apertures which are the same as the mating apertures 32*a* . . . 32*n* and 34*a* . . . . 34*n*, respectively, illustrated in FIGURES 1 and 2. The second set of mating apertures are the same as the apertures 38*a* . . . 38*n* and 40*a* . . . 40*n* (FIGURE 1), and the apertures 34*a* . . . 34*n* are optically coupled to corresponding ones of the apertures 40*a* . . . 40*n* by light pipes 50*a* . . . 50*n*, respectively, as in FIGURE 1. However, the light inputs to apertures 32*a* . . . 32*n* in guide member 18*a* and the light outputs from apertures 38*a* . . . 38*n* in FIGURE 3 differ from those in FIGURE 1, in a manner to be described. As in FIGURE 1, the arrangement of the light pipes 50*a* . . . 50*n* is shown in simplified form for the reader's convenience in following the light paths.

Left hand guide members 16*b*, 18*b*, best seen in FIGURE 5, have a first set of N light paths defined by N pairs of mating apertures 70*a* . . . 70*n* and 72*a* . . . 72*n*, respectively, and a second set of N light paths defined by N pairs of mating apertures 80*a* . . . 80*n* and 82*a* . . . 82*n*, respectively. These first and second sets of apertures in guide members 16*b*, 18*b* have the same spacing and position relative to the work station as the previously discussed spacing of the first and second sets of apertures in the guide members 16*a*, 18*a*. For example, apertures 70*a* and 72*a* are located the same distance from the work station as the apertures 34*a* and 32*a* (FIGURES 1 and 2).

A light source 68, shown in full in FIGURE 5 and in phantom in FIGURE 3, is positioned above guide member 16*b* adjacent the apertures 70*a* . . . 70*n* therein. A separate light source for each aperture 70*a* . . . 70*n* could be used in the alternative. The apertures 72*a* . . . 72*n* in lower left guide member 18*b* are optically coupled to corresponding ones of the apertures 32*a* . . . 32*n*, respectively, in lower right guide member 18*a* by means of separate light pipes 74*a* . . . 74*n*, respectively (FIGURE 3). The second set of light pipes 50*a* . . . 50*n* optically couples the apertures 34*a* . . . 34*n* in upper right guide member 16*a* to corresponding ones of the apertures 40*a* . . . 40*n*, respectively. A third set of light pipes 76*a* . . . 76*n* optically couples the apertures 38*a* . . . 38*n*, respectively, in lower right guide member 18*a* to the apertures 82*a* . . . 82*n*, respectively, in lower left guide member 18*b*. Individual photo-responsive elements 62*a* . . . 62*n* are positioned above the apertures 80*a* . . . 80*n*, respectively, in upper left guide member 16*b*.

Each complete path from light source 68 to a photo-responsive element 62*a* . . . 62*n* includes four series light paths which cross the path of card travel. For example, light from source 68 enters aperture 70*a*, crosses the path of card travel to aperture 72*a* (FIGURE 5), is coupled by light pipe 74*a* (FIGURE 3) to aperture 32*a*, recrosses the card path to aperture 34*a* (FIGURE 4), is coupled by light pipe 50*a* to aperture 40*a* (FIGURE 3), crosses the card path to aperture 38*a* (FIGURE 1), is coupled by light pipe 76*a* to aperture 82*a* (FIGURE 3), crosses the card path to aperture 80*a* (FIGURE 5) and then reaches photo-responsive element 62*a*. If a record card interrupts any of the light paths defined by apertures 70*a* and 72*a*, 32*a* and 34*a*, 40*a* and 38*a*, and 82*a* and 80*a*, no output is provided by the photo-responsive element 62*a*.

Assume that the upper right corner of the card is missing, and consider that the second row of data storage positions is in reading position. The leading edge of the card would have the relative position shown by the dashed line 90*a* of FIGURE 2. The card should then block the light path defined by aperture 40*a* and mating aperture 38*a*. In the event that the card should fail to block this light path, because of the missing corner, an erroneous output would be provided in the FIGURE 1 arrangement by the photo-responsive element 62*a*. In the FIGURE 3 arrangement, however, no output would be provided by photo-responsive element 62*a* because the left edge of the card would interrupt the light path defined by mating apertures 80*a* and 82*a* (FIGURE 5). It can be shown that no photo-responsive element 62*a* . . . 62*n* in the FIGURE 3 arrangement ever produces an erroneous indication due to a missing card corner, regardless of which card corner is missing.

What is claimed is:

1. The combination comprising:

a document work station for processing a document having N lines of index point positions, adjacent ones of said lines being spaced from each other a predetermined distance;

a first set of N light paths on the input side of said station located so as to be interrupted in sequence by a document moving toward said station, successive ones of said light paths being spaced from one another along the direction of document travel a distance equal to the distance between adjacent lines of index point positions, and the light path which is furthest from said work station being positioned so as to be unblocked when the first line of index point positions of a document is presented to said work station;

a second set of N corresponding light paths at the output side of said station located so as to be interrupted in sequence by a document moving through and away from said station, successive ones of the latter said light paths being spaced from one another along the direction of document travel a distance equal to said predetermined distance between adjacent lines of index point positions, the light path of said second set which is nearest to said work station being spaced from the furthermost light path of said first set a distance greater than the dimension of a document in the direction of document travel and not more than the sum of that document dimension plus the said distance between two adjacent lines of index point positions;

light conveying means optically coupling each light path of the first set in series with the corresponding light path in the second set and forming N series light paths;

illuminating means located at the input end of each of said series light paths; and separate light responsive means each located at the output end of a different one of said series light paths.

2. The combination comprising:

a document work station for documents having N lines of data storage positions;

a first set of N radiation paths at the input side of said station located so as to be interrupted in sequence by a document moving toward said station, successive ones of said paths being spaced from one another along the direction of document travel a distance equal to the distance between adjacent lines of data storage positions, only the path which is furthest from said station being unblocked when the first line of data storage positions of a document is presented to said station;

a second set of N corresponding radiation paths at the output side of said station located so as to be interrupted in sequence by a document leaving said work station, successive ones of the latter said paths being spaced from one another along the direction of document travel an amount equal to the distance between adjacent lines of data storage positions, the light path of said second set which is nearest said station being unblocked when the first line of data storage positions of a document is presented at said station and being interrupted by a document when the second line of data storage positions of said document is presented to said station;

radiation conveying means coupling each path of the first set in series with the like numbered path of the second set to provide N series paths;

radiation input means at the input end of each of said series paths; and a separate radiation responsive means at the output end of each of said series paths.

3. The combination comprising:

a work station for documents having N lines of data storage positions;

a first set of N light paths on the input side of said station extending across the path of document travel, successive ones of said paths being spaced from one another along the direction of document travel an amount equal to the distance between the centers of adjacent lines of data storage positions on a document, the light path which is furthest from said work station being located so as to be unblocked by a document when the first line of data storage positions of that document is presented to said work station;

a second set of N corresponding light paths at the output side of said station extending across the path of document travel with successive paths being spaced from one another along the direction of document travel a distance equal to said distance between the centers of adjacent lines of data storage positions, the light path of said second set which is nearest said work station being spaced from the furthermost light path of said first set a distance greater than the dimension of a document in the direction of document travel;

said light path of the second set which is nearest said work station being interrupted by a document when the second line of data storage positions thereof is presented to said work station;

means optically coupling each light path of the first set in series with the like numbered light path of the second set to provide N series paths each including a light path of the first set and the corresponding light path of the second set;

light input means adjacent the input end of each of said series paths; and a separate light responsive means located at the output end of each of said series paths.

4. The combination comprising:

a work station for documents having N lines of data storage positions;

a first set of N light paths on the input side of said station extending across the path of document travel, said paths being spaced from one another along the direction of document travel an amount equal to the distance between the centers of adjacent lines of data storage positions, only the light path which is furthest from said work station being located so as to be unblocked by a document when the first line of data storage positions of that document is presented to said work station;

a second set of N corresponding light paths at the output side of said station extending across the path of document travel and spaced from one another along the direction of document travel a distance equal to said distance between the centers of adjacent lines of data storage positions, the light path of said second set which is nearest said work station being spaced from the furthermost light path of said first set a distance greater than the dimension of a document in the direction of document travel, the light path of said second set which is nearest the work station being blocked when the second line of data storage positions of the document is presented to said work station;

light pipe means coupling each light path of the first set in series with the like numbered light path of the second set;

light input means adjacent the input end of each of the light paths in one of the first and second sets; and separate light responsive means each located at the output end of each of the light paths in the other of the first and second sets.

5. The combination comprising:

a document work station for documents having N lines of data storage positions;

a pair of guide members defining a channel for documents moving toward and away from said work station;

a first set of N apertures in said guide members defining light paths across the path of document travel on the input side of said station, spaced from one another along the direction of document travel a distance equal to the distance between adjacent lines of data storage positions, only the light path which is furthest from said station being unblocked when the first line of data storage positions of a document is presented to said station;

a second set of N corresponding apertures in said guide members at the output side of said station defining light paths across the path of document travel, said latter apertures being spaced from one another along the direction of document travel a distance equal to the distance between adjacent lines of data storage positions, the light path of said second set which is nearest said station being located so as to be interrupted by a document when the second line but not the first line of data storage positions thereof is presented to said station;

light input means at the input end of each of the light paths in one of said first and second sets;

means optically coupling the output end of each light path in said one of said sets to the input end of the corresponding light path in the other of said first and second sets; and light responsive means located at the output end of each light path in said other of said sets.

6. The combination comprising:

a document work station for documents having N lines of data storage positions;

a pair of guide members defining a channel for documents moving toward and away from said work station;

a first set of N apertures in said guide members defining N radiation paths across the path of document travel on the input side of said station, spaced from one another along the direction of document travel a distance equal to the distance between adjacent lines of data storage positions;

a second set of N corresponding apertures in said guide members at the output side of said station defining N radiation paths across the path of document travel, said latter apertures being spaced from one another along the direction of document travel a distance equal to the distance between adjacent lines of data storage positions;

radiation coupling means coupling each radiation path of the first set in series with the like numbered radiation path of the second set to form N series paths each including a radiation path of the first set and a corresponding radiation path of the second set;

radiation input means at the input end of each of said series paths;

separate radiation responsive means each located at the output end of a different one of said series paths; and the radiation paths of the first and second sets being located with respect to each other and to the work station such that only one series path is unblocked at any one time when a document is present at the work station.

7. The combination comprising:

a document work station for documents having N lines of data storage positions;

a pair of guide members defining a channel for document moving toward and away from said work station;

a first set of N apertures in said guide members defining N light paths across the path of document travel on the input side of said station, spaced from one another along the direction of document travel a distance equal to the distance between adjacent lines of data storage positions;

a second set of N apertures in said guide members at the output side of said station defining N correspond-light paths across the path of document travel, the latter said apertures being spaced from one another along the direction of document travel a distance equal to the distance between adjacent lines of data storage positions;

means optically coupling each of the light paths of the first set in series with the corresponding, like numbered light path of the second set to form N series paths;

light input means at the input end of each of the series paths;

light responsive means located at the ouput end of each of the series paths; and the light paths of the first and second sets being located relative to each other and to the work station so that only one of said series paths is unblocked when a line of data storage positions of a document is present at said work station.

8. The combination as claimed in claim 7, wherein said optical coupling means comprises light pipe means, and wherein said light responsive means comprises a separate light responsive device located at the output end of each different one of said series paths.

No reference cited.

MAYNARD R. WILBUR, *Primary Examiner.*

J. I. SCHNEIDER, *Assistant Examiner.*